United States Patent [19]

Sunaga et al.

[11] 4,395,743
[45] Jul. 26, 1983

[54] PINCH ROLLER DRIVE MECHANISM AND CONTROL CIRCUIT IN OPEN REEL TYPE TAPE RECORDER

[75] Inventors: Yoshimitsu Sunaga; Toshio Kamiura; Satoru Honda, all of Saitama, Japan

[73] Assignee: Pioneer Electronic Corporation, Tokyo, Japan

[21] Appl. No.: 169,240

[22] Filed: Jul. 16, 1980

[30] Foreign Application Priority Data

Jul. 16, 1979 [JP] Japan .................................. 54-90044
Jul. 16, 1979 [JP] Japan ............................. 54-96765[U]

[51] Int. Cl.³ ............................................. G11B 15/00
[52] U.S. Cl. ...................................... 360/90; 361/166
[58] Field of Search ...................... 361/166, 167, 139; 360/90, 96.2, 69

[56] References Cited

U.S. PATENT DOCUMENTS

| 3,124,722 | 3/1964 | Steiner | 361/166 |
| 3,456,124 | 7/1969 | Frank | 361/166 X |
| 4,144,552 | 3/1979 | Sibalis | 361/166 |

Primary Examiner—John H. Wolff
Attorney, Agent, or Firm—Sughrue, Mion, Zinn, Macpeak and Seas

[57] ABSTRACT

A pinch roller drive mechanism and circuit for operating the pinch roller drive mechanism for an open reel type tape recorder utilizing a dual capstan system. Both the pause plunger and play plunger are actuated at the start of a playback or recording operation which swing pinch rollers into positions in abutment with corresponding capstans. To accomplish this, a play arm is slidably mounted and moved by an actuating rod of a play plunger. Coupling arms extend from one end of the play arm to a pair of pinch roller units upon which the pinch rollers are rotatably mounted. An actuating rod from the pause plunger rotates a pause arm which has one end in abutment with a pin rigidly coupled to a central portion of the play arm. A predetermined period of time after the play plunger is initially actuated, the pause plunger is released. The coupling arms each have a guide rod at the end thereof for pressing a loaded magnetic tape into a position in abutment with an erasing head.

5 Claims, 8 Drawing Figures

PINCH ROLLER DRIVE MECHANISM AND CONTROL CIRCUIT IN OPEN REEL TYPE TAPE RECORDER

BACKGROUND OF THE INVENTION

The present invention relates to open reel type tape recorders. More particularly, the invention relates to a pinch roller drive mechanism and a control circuit therefor in an open reel type recorder utilizing a dual capstan system.

Recently, a tape recorder employing a so-called "dual capstan system" has been developed and is commercially available in which two capstans are disposed respectively upstream and downstream of the recording, reproducing (playback) and erasing heads with two pinch rollers one of which is disposed to abut with each of the two capstans.

However, a tape recorder of this type is disadvantageous in that all of the magnetic heads, namely, the recording, reproducing and erasing heads are disposed between the two capstans and accordingly the magnetic heads cannot be sufficiently spaced from one another. Specifically, the erasing head should be sufficiently spaced from the recording head because the magnetic flux of the erasing head adversely affects the recording head. That is, it is desirable that the distance between the capstans be increased. However, it is not practical to increase the distance because if the distance is increased, the drive system unavoidably becomes bulky and the reels are liable to rotate irregularly because of elongation of the belt.

This difficulty may be eliminated by positioning the erasing head outside of the capstans rather than between the capstans. However, in this case, it is difficult to satisfactorily bring the magnetic tape into sliding contact with the erasing head and accordingly the position of the tape with respect to the erasing head tends to vary greatly as result of which the material recorded on the tape may be irregularly erased or the material recorded on channels other than that which it is desired to erase may be erased.

Furthermore, a conventional tape recorder is intricate in construction because it is necessary to shift the pinch rollers to three different positions, namely, a recording position, a pause position and a stop position.

SUMMARY OF THE INVENTION

In view of the foregoing, an object of the invention is to provide a pinch roller drive mechanism and a control circuit therefor for an open reel type tape recorder utilizing a dual capstan system which is considerably simple in construction and in which the pinch rollers can be abutted against capstans simultaneously to thereby cause the magnetic tape to be run with high stability.

Another object of the invention is to provide a pinch roller drive mechanism and a control circuit therefor for an open reel type tape recorder which is relatively small in size, low in manufacturing cost and high in reliability and which minimizes interference between the magnetic heads.

In accordance with these, and other objects of the invention, there is provided a pinch roller drive mechanism for a tape recorder including a pair of pinch roller units each having a pinch roller rotatably mounted thereon. A pair of coupling arms are coupled at one end thereof to corresponding pinch roller units. The other ends of the coupling arms are coupled to a common point upon a play arm. The play arm, which is mounted to slide along a line bisecting centers of the pinch rollers, is connected to an actuating rod of a play plunger which is energized in a recording and playback operation. A first spring biases the play arm in the direction opposite that in which it is moved when the play plunger is actuated. A pause plunger is provided which also has an actuating rod. A pause arm, which is pivotally mounted in a central portion thereof, is coupled at one end to the actuating rod of the pause plunger. The other end of the pause arm is disposed in abutment with a pin which is rigidly coupled to a central portion of the play arm. When the pause plunger is actuated, the pause arm moves the pinch roller to positions slightly spaced from the capstans.

Playback and recording heads are disposed between the two capstans. First and second guides are provided outside the pair of capstans and at least one erasing head is disposed between at least one of the guides and a corresponding adjacent one of the capstans. A guide rod is provided extending from each pinch roller unit which protrudes towards a loaded magnetic tape by a distance more than the distance of the pinch rollers so that the magnetic tape may be moved to the front surfaces of the erasing heads.

The objects of the invention are also met by a circuit for operating the pinch roller drive mechanism of the invention. The circuit includes a switch for actuating the play plunger in response to a play signal and a circuit for generating a current for a predetermined period of time following the operation of the play plunger. In response to this current, a second switching circuit operates the pause plunger. The switching circuit which actuates the pause plunger is also actuated every other time a pause control signal is applied. The pause control signal is coupled to the toggle input of a toggle flip-flop a first output of which enables the play signal through a first AND gate to the input of the first switch and the other or opposite output operates the second switch independent of the operation of the current generating means. A larger current is also produced for a predetermined period of time following the first application of the play signal, after a fast forward, rewind, or stop signal has been provided. When this current is present, a switching circuit couples a relatively high potential to the play plunger actuating coil and to the pause plunger actuating coil while when the current is not present, a relatively low potential is applied thereto.

DESCRIPTION OF THE PREFERRED EMBODIMENTS

Preferred embodiments of the invention will be described with reference to the accompanying drawings.

Figure 1:
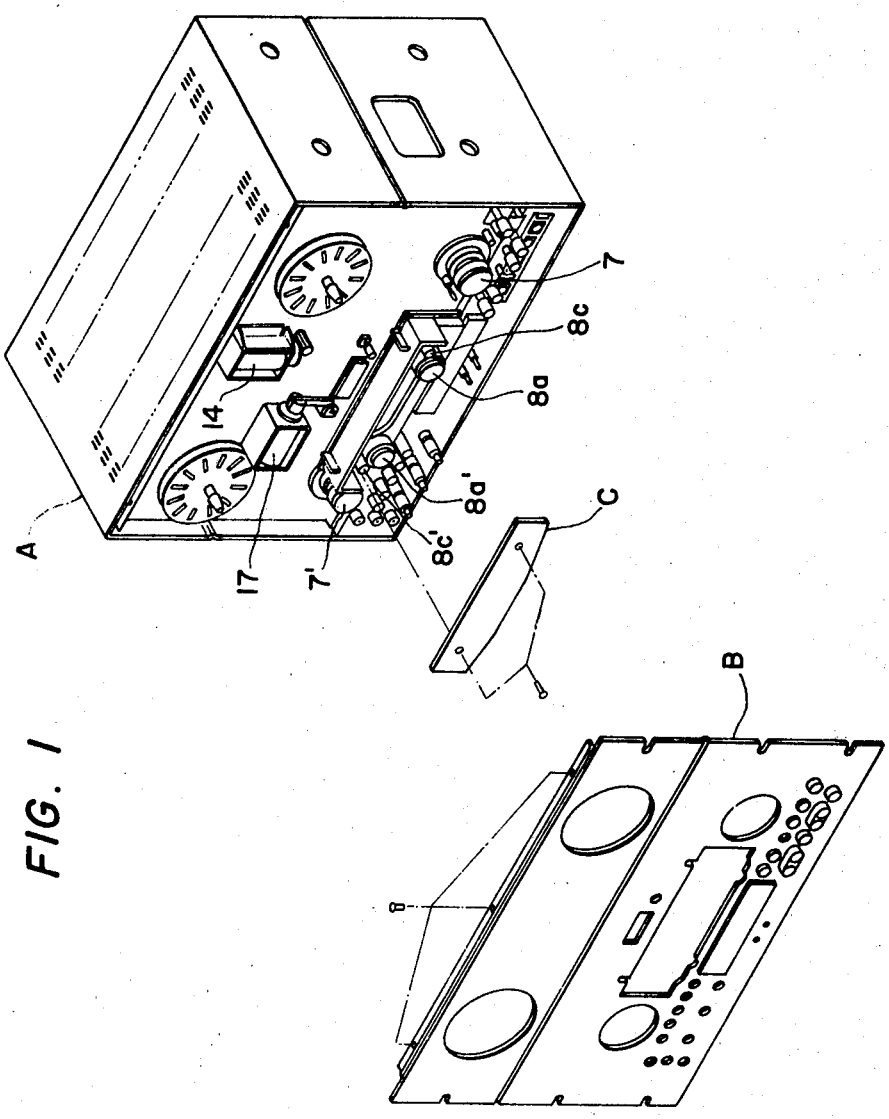
FIG. 1 is a perspective view of an open reel type tape recorder utilizing a dual capstan system from which the front plate has been removed.
Figure 2:
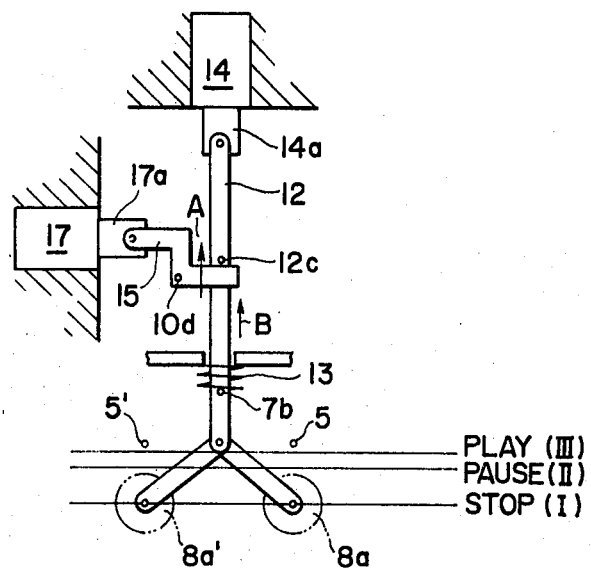
FIG. 2 is a schematic explanatory diagram showing a pinch roller drive mechanism according to the invention.

FIG. 1 is a perspective view of a dual capstan type tape recorder A from a front panel B and a cover C for a head section have been removed. FIG. 2 is a schematic explanatory diagram showing the operating mechanism of a play plunger 14 for moving two pinch rollers 8a and 8a' into abutment with capstans 5 and 5' in a dual capstan system and of a pause plunger 17 for maintaining the pinch rollers 8a and 8a' spaced by predetermined distances from the capstans 5 and 5'.

If only the pause plunger 17 is excited to retract its piston 17a, a link 15 is turned in the direction of the arrow A about a fulcrum 10d thereby lifting a play arm 12 in the direction of the arrow B through a pin 12c as a result of which the shafts of the pinch rollers 8a and 8a' are lifted from a stop position I to a pause position II. On the other hand, if only the pinch roller 14 is excited to retract its piston 14a, the pinch rollers are lifted to a reproduction or play position III. In FIG. 2, reference numeral 13 designates a spring for energizing the play arm 12 downwardly.

Figure 3:
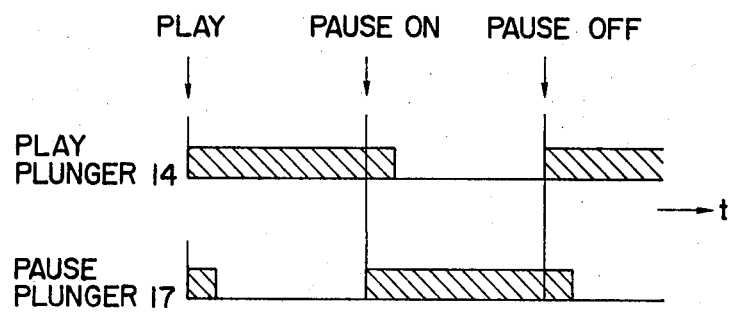
FIG. 3 is a timing chart indicating the timing of excitation of a play plunger and a pause plunger shown in FIG. 2.

At the start of the reproduction or play operation, both of the pinch plunger 14 and the pause plunger 17 are energized simultaneously to lift the pinch rollers 8a and 8a' so that the pinch rollers are positively lifted. After a predetermined period of time, the excitation of the pause plunger 17 is released. In the case where the pinch rollers are shifted from the play position to the pause position, the excitation of the pinch plunger 14 is released a predetermined period of time after the pause plunger 17 has been excited thereby maintaining the pinch rollers 8a and 8a' at the pause position II. In this case the reproduction conditions are not at all affected. The pause state can be released by releasing the excitation of the pause plunger a predetermined period of time after the pinch plunger 14 has been excited. This will become more apparent from the timing chart shown in FIG. 3 in which the hatched portions correspond to periods of excitation of the plungers.

The fundamental arrangement of the pinch roller driving mechanism according to the invention has been described. An example of the pinch roller driving mechanism will be described with reference to FIGS. 4 and 5 in more detail.

Figure 4:
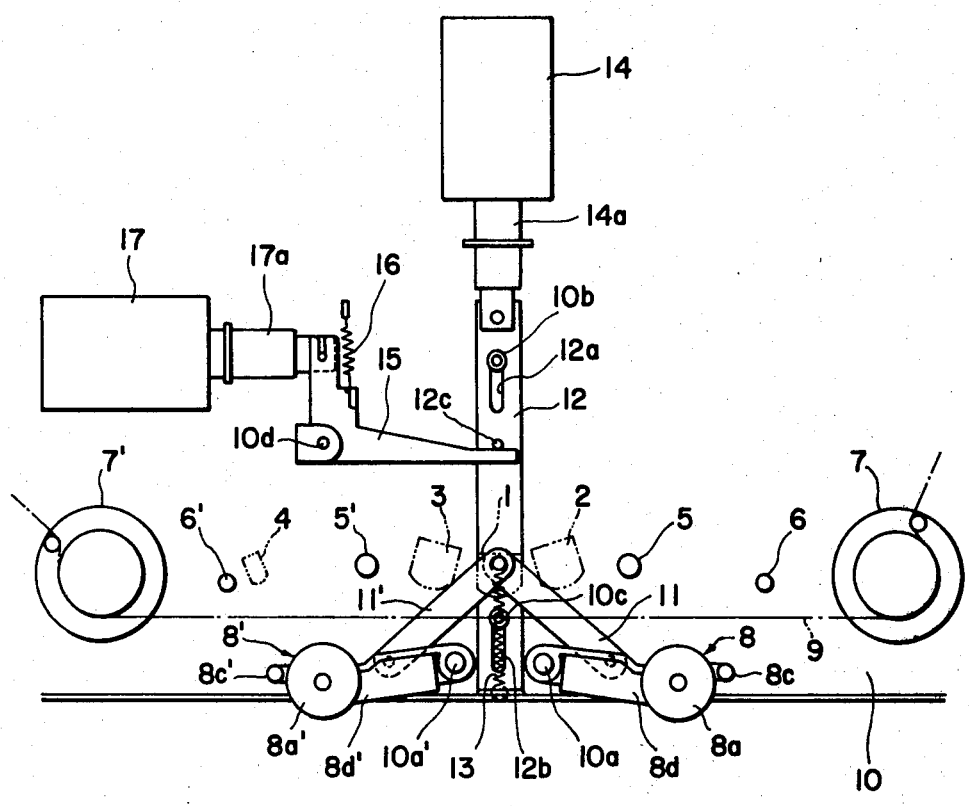
FIGS. 4 and 5 are front views for a description of the operation of a pinch roller drive mechanism constructed according to the invention.
Figure 5:
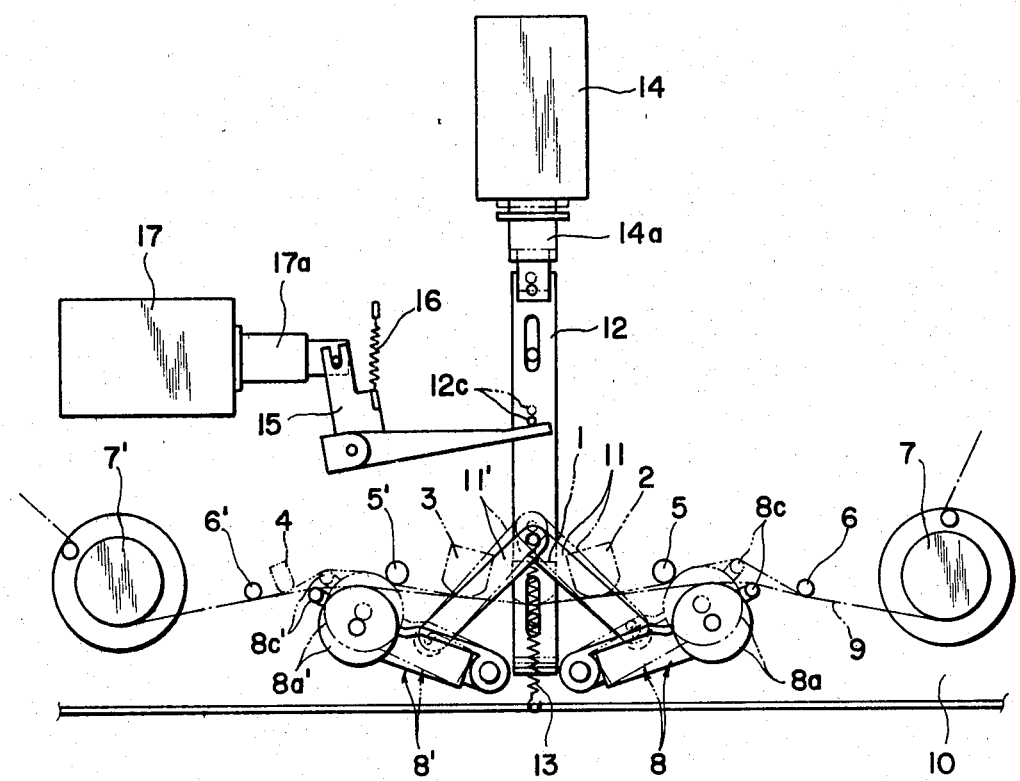

A tape recorder provided with a pinch roller driving mechanism according to the invention as shown in FIGS. 4 and 5 includes a recording head 1, a reproducing head 2 for forward operation, a reproducing head 3 for reverse operation, an erasing head 4 for forward operation, capstans 5 and 5', guides 6 and 6', tension arm units 7 and 7', and pinch roller units 8 and 8'. In this tape recorder, recording is carried out in the forward operation only. However, recording can be carried out in the reverse direction as well by providing an additional erasing head between the capstan 5 and the guide 6.

The arrangement of the above-described various parts will be described. When a magnetic tape is laid over the tension arm units 7 and 7', the various heads 1 through 4, the capstans 5 and 5' and the guides 6 and 6' are in positions above the tape 9 as viewed in FIGS. 4 and 5 while the pinch roller units 8 and 8' are below the tape 9. The recording head 1 is disposed between the reproducing heads 2 and 3 which are positioned between the capstans 5 and 5'. The erasing head 4 is disposed between the capstan 5' and the guide 6'.

Figure 6:
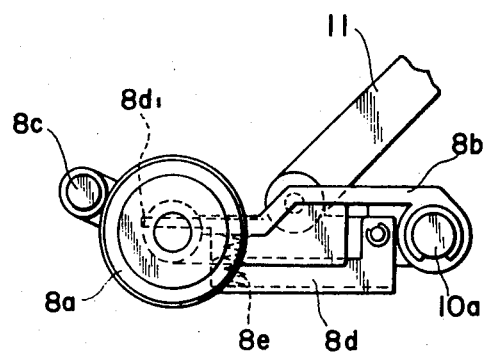
FIGS. 6 and 7 are a front view and a side view showing a pinch roller unit shown in FIGS. 4 and 5.
Figure 7:
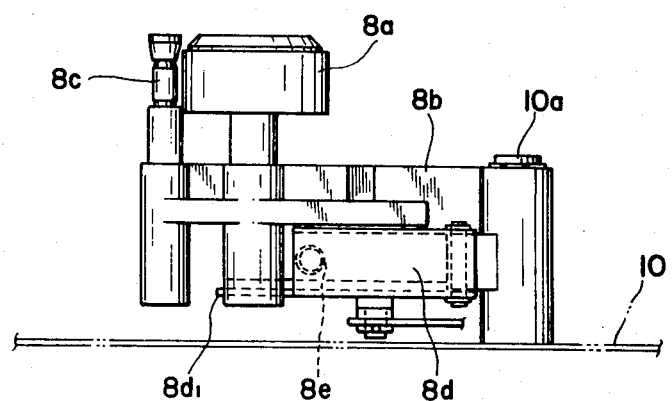

The pinch roller units 8 and 8' will be described in more detail with reference to FIGS. 6 and 7. A pinch roller 8a has a pinch roller arm 8b on which the pinch roller 8a is mounted through a bearing. The pinch roller arm 8b has a base portion which is pivotally mounted on a pin 10a which is rigidly coupled to a chassis 10. A guide rod 8c for guiding the magnetic tape is fixedly secured to the top end portion of the pinch roller arm 8b. One end portion of a spring receiving plate 8d is pivotally mounted near the base portion of the pinch roller arm 8b and the top end portion $8d_1$ of the plate 8d is in abutment with the pinch roller arm 8b. A spring 8e is interposed between the pinch roller arm 8b and the spring receiving plate 8d to urge the top end portion $8d_1$ of the plate 8d into abutment with the pinch roller arm 8b. Each of the two pinch roller units 8 and 8' is constructed as described above.

Referring back to FIGS. 4 and 5, reference numerals 11 and 11' designate coupling arms of equal lengths which are coupled to the above-described spring receiving plates 8d and 8d', respectively. Reference numeral 12 designates a play arm having guide holes 12a and 12b which are guided by guide pins 10b and 10c, respectively, which are rigidly mounted on the chassis 10. The play arm 12 is movable vertically between the pinch roller units 8 and 8'. The end portions of the coupling arms 11 and 11' are coupled to the play arm 12 the lower end portion of which is coupled through a spring 13 under tension to the chassis 10.

Further in FIGS. 4 and 5, reference numeral 14 designates a play plunger having an actuating rod 14a which is connected to the upper end portion of the play arm 12. The play plunger 14 is controlled by a circuit described below. A pause arm 15 is pivotally mounted on a pin 10d rigidly coupled to the chassis 10. One end portion of the pause arm 15 is in abutment with a protrusion 12c provided substantially at the longitudinal center of the play arm 12 with the pause arm end portion perpendicular to the play arm. A spring 16 biases the end portion of the pause arm 15 against the protrusion 12c at all times. The elastic force of the spring 16 is made smaller than that of the aforementioned spring 13. A pause plunger 17 has an actuating rod 17a which is connected to the base end portion of the pause arm 15. The pause plunger 17 is controlled by the circuit described below. The stroke L of the actuating rod 14a of the play plunger 14 is longer than the stroke l of the pulling rod 17a of the pause plunger 17 (L>l). Accordingly, when the play plunger 14 is excited, the pinch rollers 8a and 8a' are pushed into abutment with the capstans 5 and 5', respectively. However, when the pause plunger 17 is excited, the pinch rollers are not moved into abutment with the capstans. That is, they are stopped at positions slightly spaced from capstans.

Figure 8:
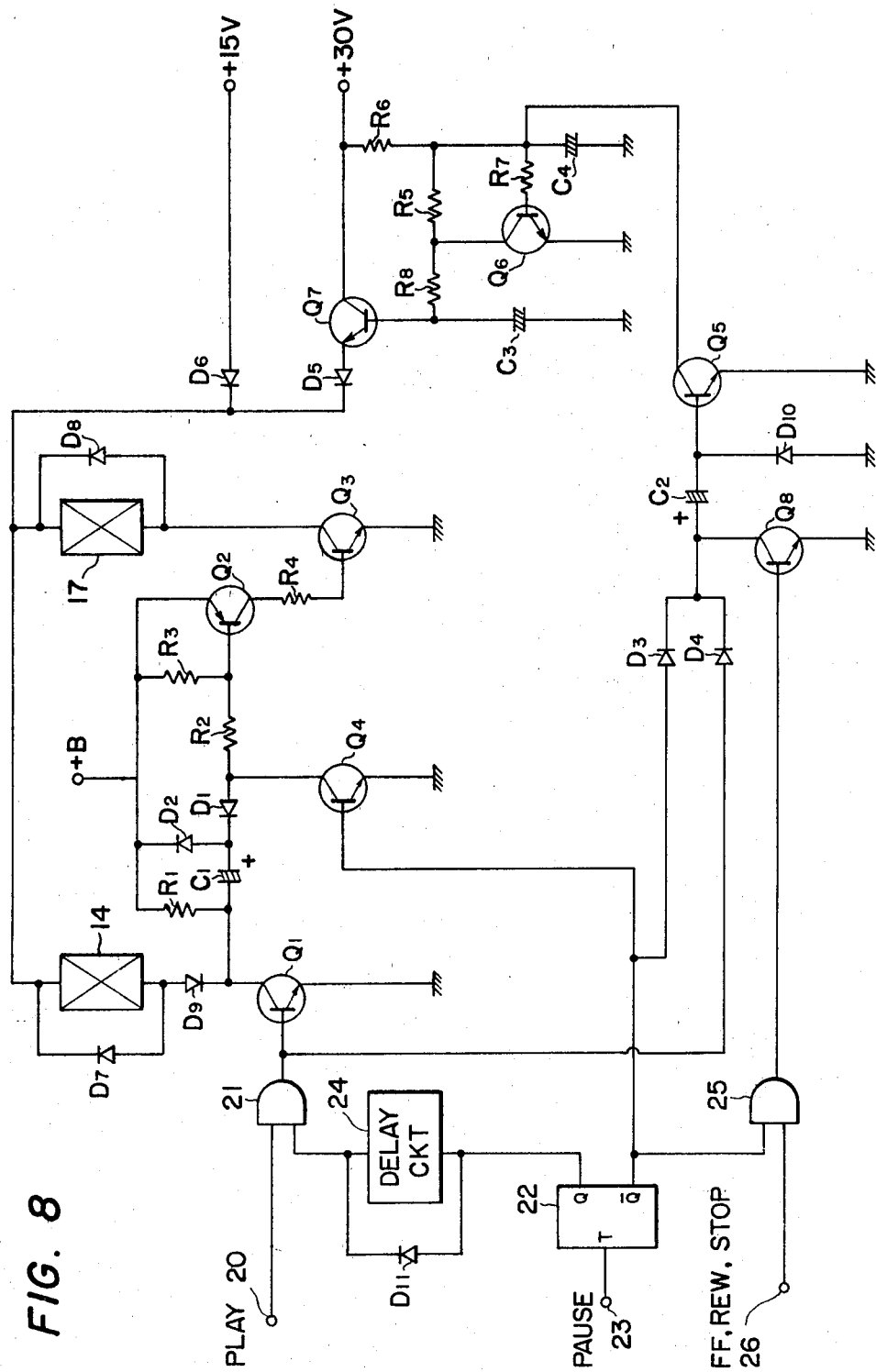
FIG. 8 is a circuit diagram showing an example of a control circuit employed with the pinch roller drive mechanism of the invention.

Shown in FIG. 8 is a pinch roller drive control circuit for performing the above-described operations. A play request signal input terminal 20 is connected through an AND gate 21 which in turn provides a play signal to the base of a transistor $Q_1$. When the transistor $Q_1$ is rendered conductive, the play plunger 14 is excited. After transistor $Q_1$ has become conductive, a transistor $Q_2$ is rendered conductive by current flowing through a capacitor $C_1$, a diode $D_1$ and a resistor $R_2$ for a predetermined period of time in response to which a transistor $Q_3$ is rendered conductive to thereby excite the pause plunger 17 for a predetermined period of time.

When the output $\overline{Q}$ of a T-type flip-flop circuit 22 is raised to a logical high level "H", a transistor $Q_4$ is rendered conductive whereby the transistor $Q_3$ is rendered conductive to thereby excite the pause plunger 17. A pause control signal input terminal 23 is connected to the input terminal T of the flip-flop circuit 22. Whenever the pause control signal is raised to "H", the flip-flop circuit 22 is alternately set and reset. The output $\overline{Q}$ of the flip-flop circuit 22 controls the transistor $Q_4$. The corresponding output Q is applied through a delay circuit 24 to the AND gate 21 to control the AND gate 21. In the description hereinafter and in the appended claims, a high level at the $\overline{Q}$ output terminal of flip-flop 22 or a low level output at the Q output terminal thereof, or a combination of these two signals, will be referred to as a "pause-on" signal.

Diodes $D_3$ and $D_4$ are provided for applying the voltage on the bases of the transistors $Q_1$ and $Q_4$ to a capacitor $C_2$ without affecting the transistors $Q_1$ and $Q_4$. When one of the diodes $D_3$ and $D_4$ is rendered conductive, a transistor $Q_5$ is rendered conductive for a predetermined period of time by a differentiation current flowing in the capacitor $C_2$ so that a transistor $Q_6$ is rendered non-conductive. As a result, a transistor $Q_7$ is rendered conductive so that a supply voltage of $+30$ V is applied through a diode $D_5$ to first terminals of the play plunger 14 and of the pause plunger 17. In this operation, a diode $D_6$ connected to an electric source $+15$ V is rendered non-conductive.

The capacitor $C_1$ is discharged through a diode $D_2$ and a resistor $R_1$. In FIG. 8, reference numeral 25 designates an AND gate and reference numeral 26 designates an input terminal to which a stop operation signal, a rewinding operation signal and a fast-forwarding operation signal are applied.

The flip-flop circuit 22 is so designed that when the power switch is turned on, its outputs Q and $\overline{Q}$ are set to "H" and "L", respectively. Therefore, when the power switch is turned on, the AND gate 21 is opened by the high level signal through a diode $D_{11}$. When, under this condition, a high level signal is applied to the play request signal input terminal 20, the signal is conveyed through the AND gate 21 as a play signal through the diode $D_4$ to the capacitor $C_2$ to charge the capacitor $C_2$. Therefore, the charge current renders the transistor $Q_5$ conductive as a result of which the transistor $Q_6$ is rendered non-conductive and the transistor $Q_7$ is therefore rendered conductive. Accordingly, the supply voltage $+30$ V is applied to the play plunger 14 and the pause plunger 17. At the same time, the transistor $Q_1$ becomes conductive in response to the play signal to excite the play plunger 14 while the transistor $Q_2$ is rendered conductive by the charge current applied to the capacitor $C_1$ as a result of which the transistor $Q_3$ is rendered conductive to thereby excite the pause plunger 17.

As is clear from the above description, in the play operation, both the play plunger 14 and the pause plunger 17 are excited by the supply voltage $+30$ V as a result of which the play arm 12 is lifted in the direction of the arrow B and the pinch rollers $8a$ and $8a'$ are moved into firm abutment against the capstans 5 and 5', respectively, shown in FIG. 2. Thereafter, as the capacitor $C_1$ is charged, both of the transistors $Q_2$ and $Q_3$ are rendered non-conductive. On the other hand, as the capacitor $C_2$ is charged, the transistors $Q_5$ and $Q_6$ and $Q_7$ are rendered non-conductive, conductive and non-conductive, respectively, as a result of which the supply voltage $+15$ instead of the voltage $+30$ V is applied to the plungers. That is, the play plunger 14 is held by the low voltage.

When, under this condition, a high level pulse is applied to the pause control signal input terminal 23, the state of the flip-flop circuit 22 is changed so that its outputs Q and $\overline{Q}$ are then at "L" and "H", respectively, thereby providing a pause-on signal. Therefore, the transistor $Q_4$ is rendered conductive and hence the transistors $Q_2$ and $Q_3$ are also rendered conductive as a result of which the pause plunger 17 is excited. The output Q at "L" of the flip-flop circuit 22, after being delayed for a predetermined period of time by the delay circuit 24, is applied to the AND gate 21 to close the AND gate 21 to terminate the play signal output of gate 21 and therefore render the transistor $Q_1$ non-conductive. That is, the excitation of the play plunger 14 is released a predetermined period of time after the pause plunger 17 has been excited. As a result, the pinch rollers $8a$ and $8a'$ are set slightly apart from the respective capstans 5 and 5' in the pause state. In this case, the capacitor $C_1$ is discharged because the transistor $Q_1$ is non-conductive.

When a high level pulse is again applied to the pause control signal input terminal 23, the state of the flip-flop circuit 22 is restored so that its output Q and $\overline{Q}$ are at "H" and "L", respectively. Therefore, the transistor $Q_4$ is rendered non-conductive while the output Q at "H" of the flip-flop circuit 22 is applied through the diode $D_{11}$ to the AND gate 21 to open the AND gate so that the transistor $Q_1$ is rendered conductive. Accordingly, the transistor $Q_2$ is maintained conductive by the charging current flowing to the capacitor $C_1$ and the pause plunger 17 is kept in the excited state for the period of time during which the charge current flows in the capacitor. On the other hand, the play plunger 14 is continuously excited after the transistor $Q_1$ has been rendered conductive. When the pause state is released, the play plunger 14 is excited and the excitation of the pause plunger 17 is released after the excitation of the play plunger.

Now, the operation of the overall tape recorder provided with a pinch roller drive mechanism and control circuit of the invention will be described. In loading the magnetic tape 9, the pinch roller units 8 and 8' are retracted from the tape running path and so that the tape 9 can be readily laid over the tension arm units. After the tape has been loaded, the play operation is effected and the two plungers 14 and 17 are energized simultaneously by the circuit shown in FIG. 8. As a result, the play arm 12 is pulled fully upwardly by the actuating rods $14a$ and $17a$ of the plungers 14 and 17 through the pause arm 15 against the elastic force of the spring 13. Accordingly, the coupling arms 11 and 11' are also pulled upwardly to turn the pinch roller units 8 and 8' so that the pinch roller units 8 and 8' are moved into abutment with the capstans 5 and 5', respectively as indicated by the phantom lines in FIG. 5. In this operation, the pinch rollers $8a$ and $8a'$ are elastically urged towards the capstans 5 and 5' by the springs $8e$ with the amount of force applied determined such that no excessive force is applied to the capstans 5 and 5'.

In the play operation, the guide rods $8c$ and $8c'$ rather than the pinch rollers $8a$ and $8a'$ depress the tape 9 as a result of which the tape 9 is shifted to the erasing head 4 provided between the guide 6' and the guide $8c'$. With this construction, the tape 9 is brought satisfactorily into sliding contact with the erasing head.

The pause plunger 17 is deenergized after a predetermined period of time and the pinch roller units 8 and 8' are maintained in abutment with the capstans 5 and 5' by the play plunger 14 only.

In the pause operation, the play plunger 14 is deenergized after the pause plunger 17 is energized. The play arm 12 is then pulled by the spring 13 and is stopped when the protrusion 12c comes into abutment with the end portion of the pause arm 15. Accordingly, the coupling arms 11 and 11' are slightly moved downwardly so as to retract the pinch roller units 8 and 8'. When the changeover to the pause state has been completed, the pinch rollers 8a and 8a' are spaced apart from the capstans 5 and 5' as indicated by the solid lines in FIG. 5.

When the stop operation is carried out, the pause plunger 17 is deenergized and the play arm 12 is pulled by the spring 13 as shown in FIG. 4.

As is clear from the above description, in the pinch roller drive mechanism according to the invention, the pause arm operated by the pause plunger is engaged with the middle portion of the play arm which operates to move the pinch rollers into abutment with the capstans. The amount of movement of the play arm operated by the pause arm is made less than that of the play arm operated by the play plunger. Therefore, when the play plunger is energized, the pinch rollers are moved into abutment with the capstans. When the pause plunger is energized, the pinch rollers are slightly spaced from the capstans, and when both of the plungers are deenergized, the pinch rollers are returned to the stop position.

A significant feature of the invention resides in that the two plungers are excited at the start of the playback operation and the excitation of the pause plunger is released after a fixed predetermined period of time. Therefore, when the pinch rollers are spaced farthest from the capstans as in the stop state or in the fast-forwarding operation or in the rewinding operation, the tape recorder is placed in the playback state and movement of the pinch rollers with respect to the capstans is carried out not only by the play plunger but also by the pause plunger. Therefore, even if the pinch rollers are relatively heavy, they can be positively moved into abutment with the capstans. Thus, the pinch roller drive mechanism and its control circuit are most suitable for a dual capstan type tape recorder.

Furthermore, according to the invention, in the recording or reproducing (playback) operation, the guide rods provided at the ends of the pinch roller units are protruded further towards the tape than the pinch rollers so that the tape is moved to the erasing head positioned between the guide and the guide rod. Accordingly, the material recorded on the tape can be uniformly erased and erasing of material recorded on other channels can be positively prevented. Also, with the invention, the pinch roller drive mechanism is simple in construction, low in manufacturing cost, and is essentially maintenance-free.

What is claimed is:

1. A circuit for operating a pinch roller drive mechanism having a play plunger actuating coil and a pause plunger actuating coil comprising:

a first AND gate, a play signal being coupled to a first input of said first AND gate;

a toggle flip-flop, a pause signal being coupled to a toggle input of said toggle flip-flop;

a delay circuit and a first diode coupled in series with one another between one output of said toggle flip-flop and a second input of said first AND gate;

a first transistor switch coupled to actuate said play plunger actuating coil, said first transistor switch operating in response to an output of said first AND gate;

means for producing a current flow for a predetermined period of time following actuation of said first transistor switch;

a second transistor switch coupled to actuate said pause plunger actuating coil in response to the flow of current produced by said current producing means;

a third transistor switch operating in response to a second output of said toggle flip-flop, said third transistor switch being coupled to actuate said second transistor switch independently of said current generating means;

a second AND gate, said second output of said toggle flip-flop being coupled to a first input of said second AND gate and at least one of a fast-forward, rewind, and stop signals being coupled to a second input of said second AND gate;

a fourth transistor switch;

means for actuating said fourth transistor switch for a predetermined period of time following the presence of the high level output signal on the output of said second AND gate, a high level signal at said second output of said toggle flip-flop and a high level output signal at said output of said first AND gate; and a switching circuit operating in response to an output of said fourth transistor switch for applying a first relatively high potential to said play plunger actuating coil and said pause plunger actuating coil when said fourth transistor switch is actuated and a relatively low potential to said play plunger actuating coil and said pause plunger actuating coil when said fourth transistor switch is inactive.

2. In a tape transport mechanism of the type including a play plunger actuating coil, a pause plunger actuating coil and pinch roller means movable to a play position when said play plunger actuating coil is energized and movable to a pause position different from said play position when said pause plunger actuating coil is energized and said play plunger actuating coil is not energized, a control circuit comprising:

means for generating a play signal;

a first switching circuit activated in response to said play signal for energizing said play plunger actuating coil;

means for generating a current for a predetermined period of time upon activation of said first switching circuit; and a second switching circuit activated in response to said current for energizing said pause plunger actuating coil, said second switching circuit being deactivated after said predetermined period of time while said first switching circuit is still activated.

3. A control circuit as claimed in claim 2, further comprising means for generating a pause-on signal and means responsive to said pause-on signal for activating said second switch means regardless of the presence or absence of said current.

4. A control circuit as claimed in claim 2 or 3, further comprising delay means responsive to said pause-on signal for disabling said means for generating said play signal a predetermined delay time after generation of said pause-on signal.

5. A control circuit as claimed in claim 4, wherein said tape transport mechanism is capable of fast-forward, rewind and stop operations, said control circuit including potential supply means for providing either one of a first potential or a second potential higher than said first potential to said play plunger and pause actuating coils for energization thereof, said potential supply means providing said second potential for a predetermined period of time when said play signal is generated after any one of said fast-forward, rewind or stop operations has been performed during the existence of said pause-on signal.

* * * * *